(12) United States Patent
Mundt et al.

(10) Patent No.: US 10,140,238 B2
(45) Date of Patent: Nov. 27, 2018

(54) OPEN COMPUTE PROJECT NETWORK CARD CONVERTED TO PCIE RISER

(71) Applicant: Dell Products L.P., Round Rock, TX (US)

(72) Inventors: Kevin Warren Mundt, Austin, TX (US); Scott Michael Ramsey, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 172 days.

(21) Appl. No.: 15/069,395

(22) Filed: Mar. 14, 2016

(65) Prior Publication Data

US 2017/0262396 A1 Sep. 14, 2017

(51) Int. Cl.
*G06F 13/40* (2006.01)
*G06F 13/42* (2006.01)

(52) U.S. Cl.
CPC ........ *G06F 13/409* (2013.01); *G06F 13/4068* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 9,713,279 | B2* | 7/2017 | Tseng | H05K 7/1487 |
| 2007/0124529 | A1* | 5/2007 | Carr | G06F 13/409 |
| | | | | 710/317 |
| 2010/0195289 | A1* | 8/2010 | Hubal | G06F 1/181 |
| | | | | 361/733 |
| 2013/0031288 | A1* | 1/2013 | Richard | G06F 13/4022 |
| | | | | 710/301 |
| 2013/0294023 | A1* | 11/2013 | Gay | G06F 1/187 |
| | | | | 361/679.31 |

OTHER PUBLICATIONS

Server/SpecsAndDesigns by OpenCompute, <<http://www.opencompute.org/wiki/Motherboard/SpecsAndDesigns>> 11 pages, last modified Mar. 7, 2016.
Jia Ning's, OCP Mezzanine card 2.0 Design Specification Open Compute Project, version 0.95 <<http://files.opencompute.org/oc/public.php?service=files&t=bbc6250d1a5a0e19672ba6cf2c3e3801>> 41 pages Feb. 11, 2015.

* cited by examiner

*Primary Examiner* — Elias Mamo
(74) *Attorney, Agent, or Firm* — Baker Botts L.L.P.

(57) ABSTRACT

An Open Compute Project (OCP) mezzanine riser with repurposed connectivity to allow for increased PCIe card count on a motherboard server. The OCP mezzanine riser includes at least one OCP connector, where the OCP connectors are mounted on the bottom of the mezzanine riser card and mate with at least one of three OCP connection points that are mounted on a server motherboard. Further, the OCP mezzanine riser includes one or more PCIe lanes mounted on the top of the mezzanine riser card, where a PCIe card may be connected to the one or more PCIe lanes of the mezzanine riser.

14 Claims, 10 Drawing Sheets

OPEN COMPUTE PROJECT NETWORK CARD CONVERTED TO PCIE RISER

BACKGROUND

Field of the Disclosure

This disclosure relates generally to information handling systems and more particularly to an Open Compute Project network mezzanine card that may be converted to a PCIe riser.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many instances of information handling include a motherboard which may be installed in server chassis, such as in data centers. Examples of a chassis include a rack chassis or a tower chassis. A motherboard generally includes connection points for Peripheral Component Interconnect (PCI) cards or PCI express (PCIe) cards. PCI cards are used to connect peripheral devices such as modems, sound cards, or other hardware devices to the information handling system. PCIe connectors situated at the rear of the motherboard are arranged to allow a series of vertical PCIe cards to be connected in a tower chassis, or to utilize vertical riser boards that allow for horizontal PCIe cards in low profile rack chassis. By way of non-limiting example, an example motherboard may include as many as six PCIe connection points for connecting PCIe cards.

Newer servers however have begun to implement Open Compute Project (OCP) network mezzanine cards as the industry standard network form factor. A typical OCP mezzanine card has the width of three PCIe connector slots on a server motherboard, and the connectors required to adopt this mezzanine card take the space of and eliminate three possible connection points for additional PCIe cards.

While the OCP network mezzanine card is becoming the industry standard network form factor, a large percentage of server customers use only a lower bandwidth (e.g., 1 Gb) networking solution. An example motherboard server may come pre-populated with a LAN on Motherboard (LOM) low bandwidth networking solution, and the OCP network mezzanine card is not necessary. For this set of customers, the OCP connection points that would be used for higher bandwidth networking solutions would not only go unutilized, but would create wasted space where PCIe lanes would have existed in older servers.

There is a need for a method for repurposing the connectivity of an OCP network mezzanine card for use as one or more general purpose PCIe lanes by utilizing an OCP mezzanine riser with connection points for PCIe cards.

SUMMARY

The disclosed invention includes an information handling system (IHS).

In certain embodiments, the IHS may include a motherboard and a chassis which is configured to house one or more components of the information handling system. The IHS may further include one or more connection points attached to the motherboard, where the connection points are designated for a mezzanine card. By way on non-limiting example, these connection points may be Open Compute Project (OCP) connection points designated for an OCP mezzanine card. Alternatively, these connection points may be designated for another form of mezzanine card, including but not limited to Dell's Network Daughter Card (NDC).

In one aspect, the IHS may further include a mezzanine riser which connects to the OCP or other connection points, and repurposes connectivity to allow for increased PCIe card count on the server motherboard. By way of non-limiting example, the mezzanine riser may be an OCP mezzanine riser.

In certain embodiments, the OCP mezzanine riser can include a circuit board, where at least one connector is mounted on the first side of the circuit board and configured to mate with at least one OCP connection point of a server motherboard. The OCP mezzanine riser can further include one or more PCIe lanes mounted on the second side of the circuit board, where a PCIe card may be inserted into the one or more PCIe lanes of the mezzanine riser card.

In certain embodiments, the OCP mezzanine riser may include an additional connector, where the additional connector may be mounted on one side of the circuit board of the mezzanine riser card and is configured to connect to a power pin on the server motherboard. The additional connector provides increased power capability and sideband signals as required for a typical PCIe card.

In certain embodiments, the OCP mezzanine riser may be horizontally oriented, parallel to the motherboard of a server. Alternatively, in other embodiments, the OCP mezzanine riser may be vertically oriented, perpendicular to the motherboard of a server.

In certain embodiments, the OCP mezzanine riser may be connected to only one of the available OCP connection points on a server mother board, the OCP connection point being an OCP type A connection point and providing connectivity for one x8 PCIe lane. Alternatively, in other embodiments, the OCP mezzanine riser may be connected to at least two OCP connection points on a server mother board, the connection points being OCP type A and type B connection points, where the connection points act separately to provide connectivity for two x8 PCIe lanes. Alternatively, in other embodiments, the OCP mezzanine riser may be connected to at least two OCP connection points on a server mother board, the connection points being OCP type A and type B connection points, where the connection points act contiguously to provide connectivity for one x16 PCIe lane.

In certain embodiments, the IHS may further include a SERDES network card, the network card being implemented to allow for a Ethernet upgrade path (e.g., 10 Gb).

In such embodiments, the SERDES network card may be connected to an unpopulated OCP connection point on a server motherboard, the unpopulated connection point being an OCP type C connection point.

In certain embodiments, the OCP mezzanine riser may be connected to at least three OCP connection points on the server mother board, wherein the three OCP connection points comprise an OCP type A connection point, an OCP type B connection point, and an OCP type C SERDES connection point, wherein the SERDES connection point allows for an upgraded Ethernet pathway.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments of an information handling system and the disclosed subject matter are best understood by reference to FIGS. 1, 2A, 2B, 3, 4A, 4B, 4C, 5A, and 5B wherein like numbers are used to indicate like and corresponding parts.

Figure 1:
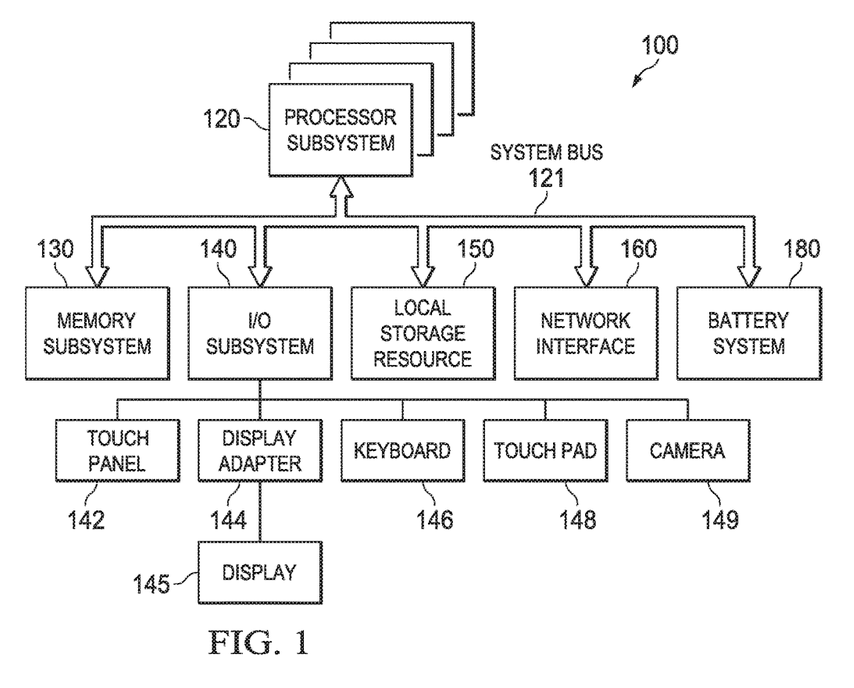
FIG. 1 is a block diagram of selected elements of an embodiment of an information handling system.

Turning now to the drawings, FIG. 1 illustrates a block diagram depicting selected elements of an embodiment of an information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Figure 2A:
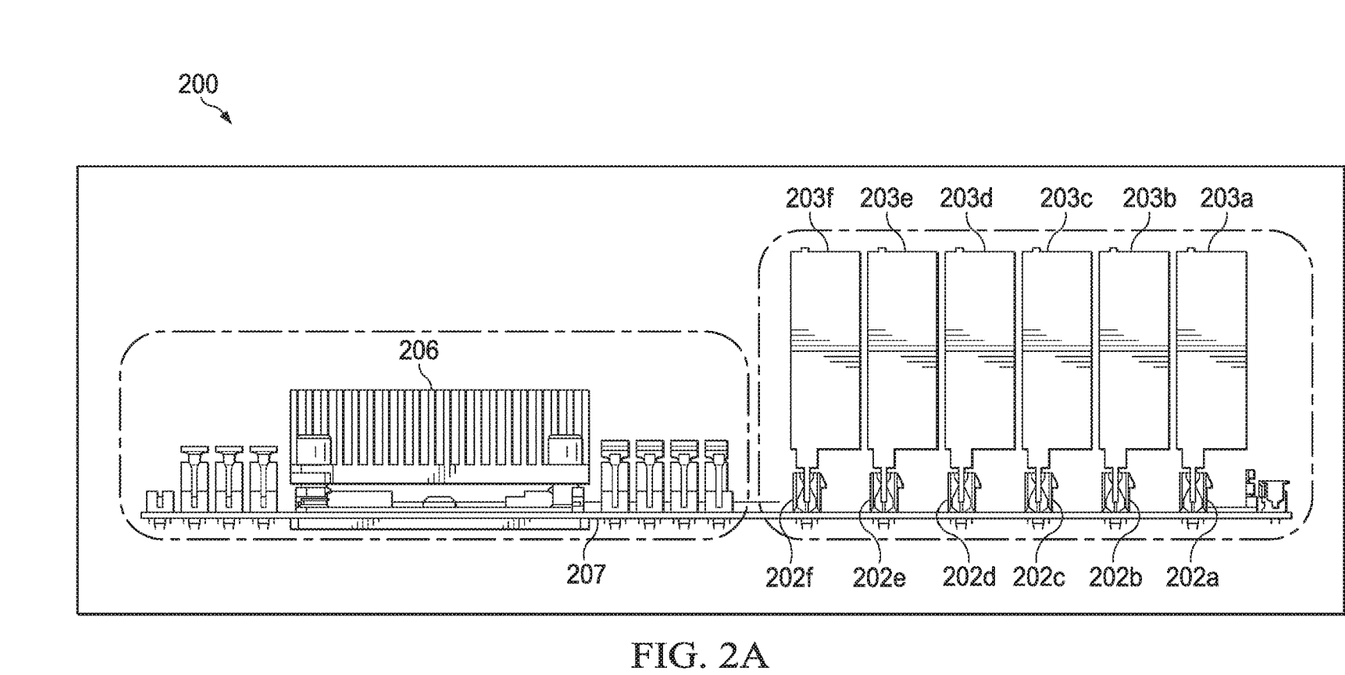
FIG. 2A is a perspective view of selected elements of an example server motherboard, as arranged to fit in a tower chassis.
Figure 2B:
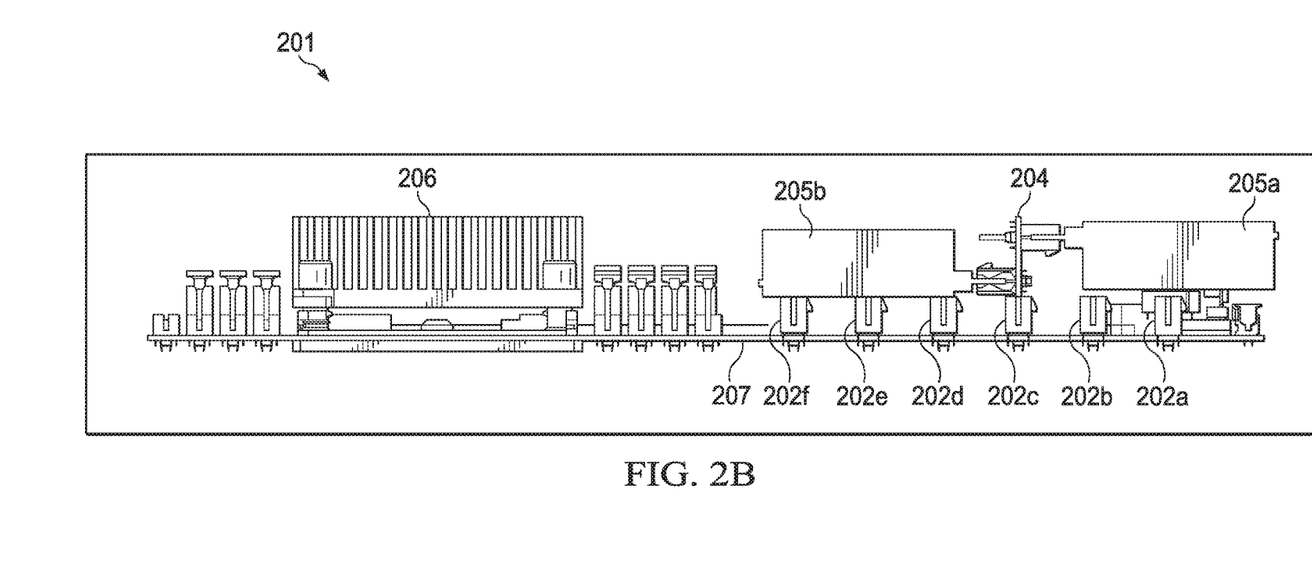
FIG. 2B is a perspective view of selected elements of an example server motherboard, as arranged to fit in low profile rack chassis.

Referring now to FIGS. 2A and 2B, perspective views of selected elements of an example server motherboard are shown. FIG. 2A shows a server motherboard 207 as arranged to fit in a tower chassis 200. FIG. 2B shows a server motherboard 207 as arranged to fit in a low profile rack chassis 201. As noted previously, the server chassis used in domains generally include connection points 202 for PCI or PCIe cards, which are used to connect peripheral devices such as modems, sound cards, or other hardware devices to the information handling system. As shown, in FIG. 2A, PCIe connectors 202 situated at the rear of a motherboard 207 may be arranged to allow for a series of vertical PCIe cards 203 to fit into a tower chassis 200. Alternatively, as shown in FIG. 2B, a vertical riser 204 may be connected to any PCIe connection point 202. PCIe cards 205 may then be horizontally oriented and connected to the vertical riser 204, allowing for multiple PCIe cards 205 to be installed in a low profile rack chassis 201.

In some new server systems, there has been a desire to implement an industry standard network form factor known as the Open Compute Project (OCP) network mezzanine card. The OCP generally, is an organization which openly shares designs of data center products among several companies. As part of this initiative, an OCP mezzanine card has been developed which may be installed on a motherboard in order to provide extended functionality. This extended functionality may for example include support for 10 GbE PCIe devices. As part of this initiative, many new server motherboards have been created with the appropriate connectors to facilitate adoption of these OCP network mezzanine cards.

Figure 3A:
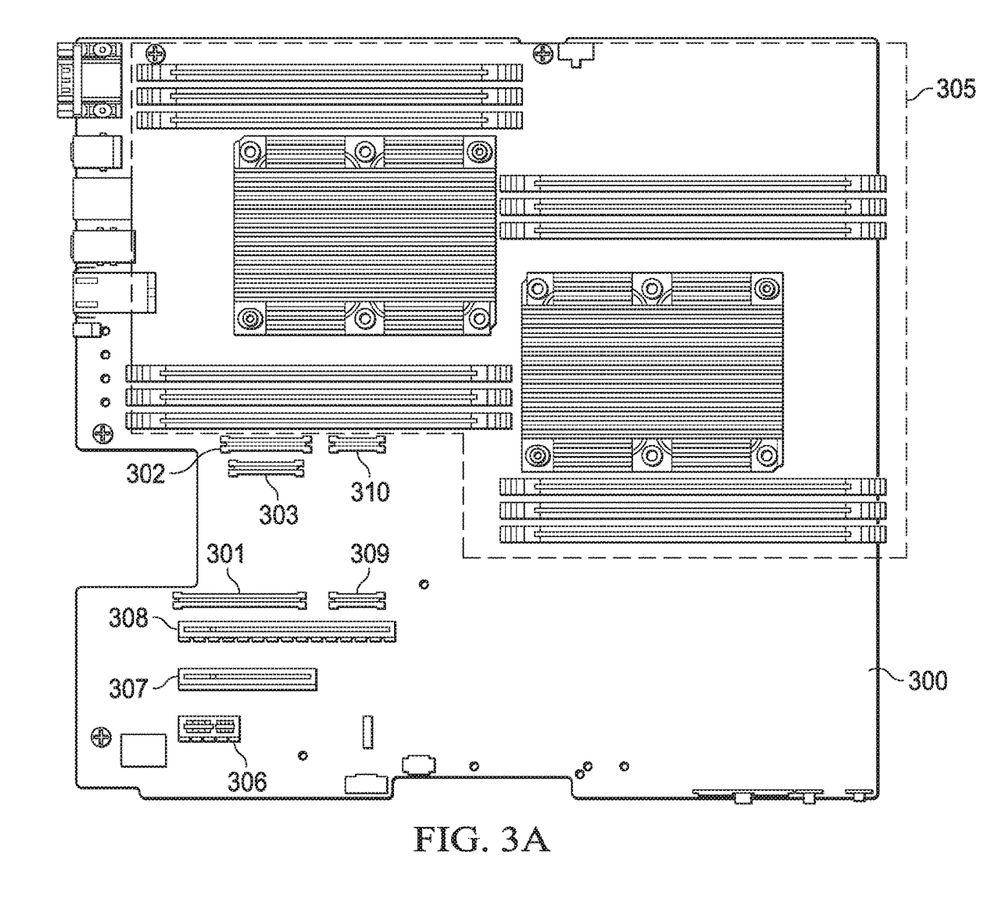
FIG. 3A is a perspective view of a particular embodiment of an example Open Compute Project mezzanine card.
Figure 3B:
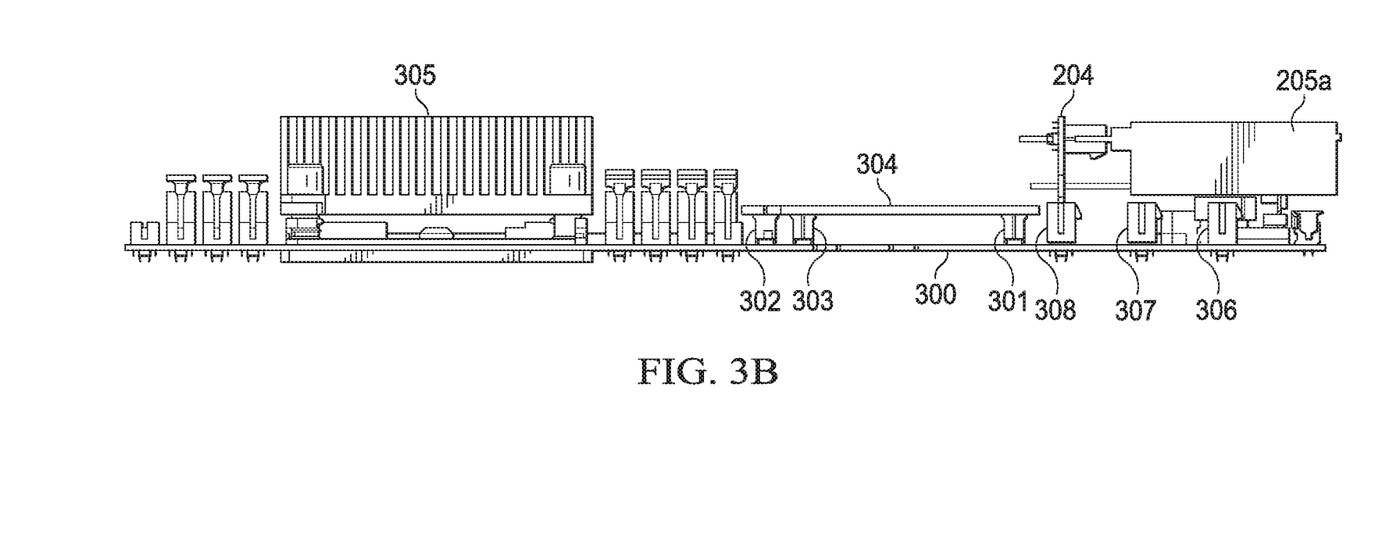
FIG. 3B is a perspective view of a particular embodiment of an Open Compute Project mezzanine card connected to a server motherboard.

Particular embodiments of an OCP network mezzanine card are best understood by reference to FIGS. 3A and 3B. FIG. 3A provides a top down view of a server motherboard 300 including OCP type A connection point 301, OCP type B connection point 302, and OCP type C connection point, 303, for an OCP network mezzanine card. In an example OCP compatible motherboard 300, connection point 301 can include a 120 pin connector which has PCIe x8, I2C and NC-SI sideband signals, and power pins 309. OCP connection point 301 may be used independently. Connection point 302 can include an 80 pin connector with PCIe x8. Connection point 302 does not have power pins or sideband signals and may not be used independently, but may be used in connection with connection point 301 to have PCIe x16 capability. Connection point 303 can include a 64 pin connector with I2C side band signals and power pins 310. Connection point 303 can be used independently as a proprietary connector that may be used to bring up networking SERDES connectivity and power so that Ethernet connectors may be modularized. As shown, an example OCP compatible motherboard 300 may include traditional PCIe lanes 306-308 for connecting PCIe cards to the server motherboard 300.

FIG. 3B illustrates a side view of motherboard 300 with an OCP network mezzanine card 304 connected to connection points 301, 302, and 303. As shown in both FIGS. 3A and 3B, the OCP connection points 301-303 take the space of three example PCIe connector slots on a server motherboard, eliminating three possible connection points for additional PCIe cards.

In certain embodiments, a base level OCP mezzanine card is equipped for a x8 PCIe device that utilizes only OCP connection point 301 on the server motherboard. To utilize 1 Gb or 10 Gb Ethernet, the x8 PCIe from OCP connection point 301 is all that is necessary. However, in other embodiments, as shown in FIG. 3B, an OCP mezzanine card 304 may be equipped for a x16 PCIe device that is intended for high speed communication. As shown, an x16 OCP network mezzanine card 304 has an increased width that spans and is connected to both OCP connection points 301 and 302.

While the OCP mezzanine card is becoming the industry standard network form factor, some customers use only a low bandwidth (e.g., 1 Gb) networking solution. An example motherboard server may come pre-populated with a LAN on Motherboard (LOM) low bandwidth networking solution. For this set of customers, the OCP connection points 301-303 that would be used for higher Gb networking solutions would not only go unutilized, but would create wasted space where PCIe lanes that typically would be used for PCIe I/O cards in older servers could be located. As will be described in further detail, the present disclosure provides a method for repurposing OCP connection points for use as one or more general purpose PCIe slots by utilizing an OCP mezzanine riser with connection points for PCIe cards. A mezzanine riser card may be provided that utilizes one or more of the OCP connection points 301-303 on a server motherboard 300. In order for a PCIe riser to be connected to the OCP connection points 301-303 on a server motherboard 300, the riser may be equipped with OCP compatible connectors that mate with the OCP connection points 301-303 on the motherboard 300. By way of non-limiting example, the OCP compatible connectors may include FCI type connectors.

In order for a riser to be used for PCIe devices, there should be an adequate power supply to provide the current necessary for a PCIe card. OCP connection point 301 generally has the capability to supply power to a typical OCP mezzanine network card 304, but its power pins are unable to supply the higher current that is required for a PCIe card. OCP connection point 303 has no defined power pins at all. Additionally, a typical PCIe input/output card includes sideband signals that are not included in an example OCP network mezzanine card definition. In order to supply the increased power and sideband signals required to run a typical PCIe input or output card, particular embodiments of the disclosed invention may implement an additional connector that can be connected to power pin 309. This additional connector can provide the increased power and sideband signals required for typical PCIe cards.

Particular embodiments of OCP connection points that are converted to PCIe connectors are best understood by reference to FIGS. 4A, 4B, 4C, 5A, and 5B.

Figure 4A:
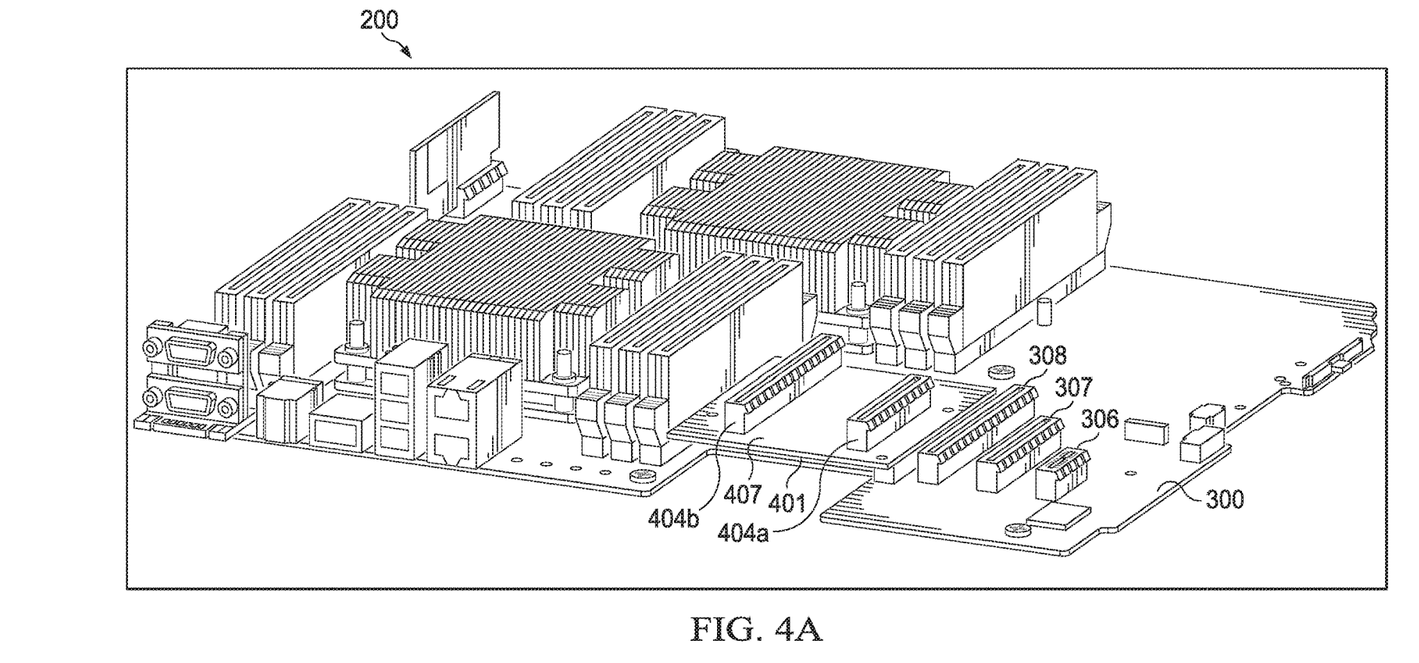
FIGS. 4A, 4B, and 4C are perspective views of selected elements of an embodiment of an OCP mezzanine riser with repurposed connectivity for PCIe cards in a tower chassis.
Figure 4B:
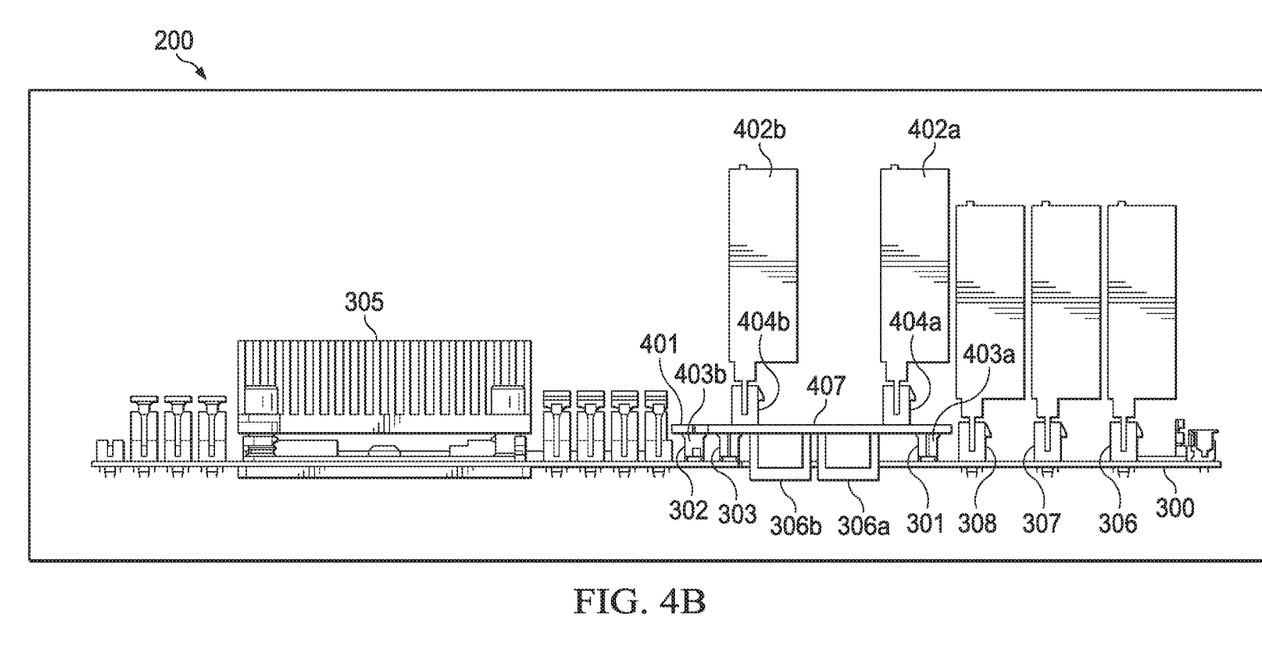
Figure 4C:
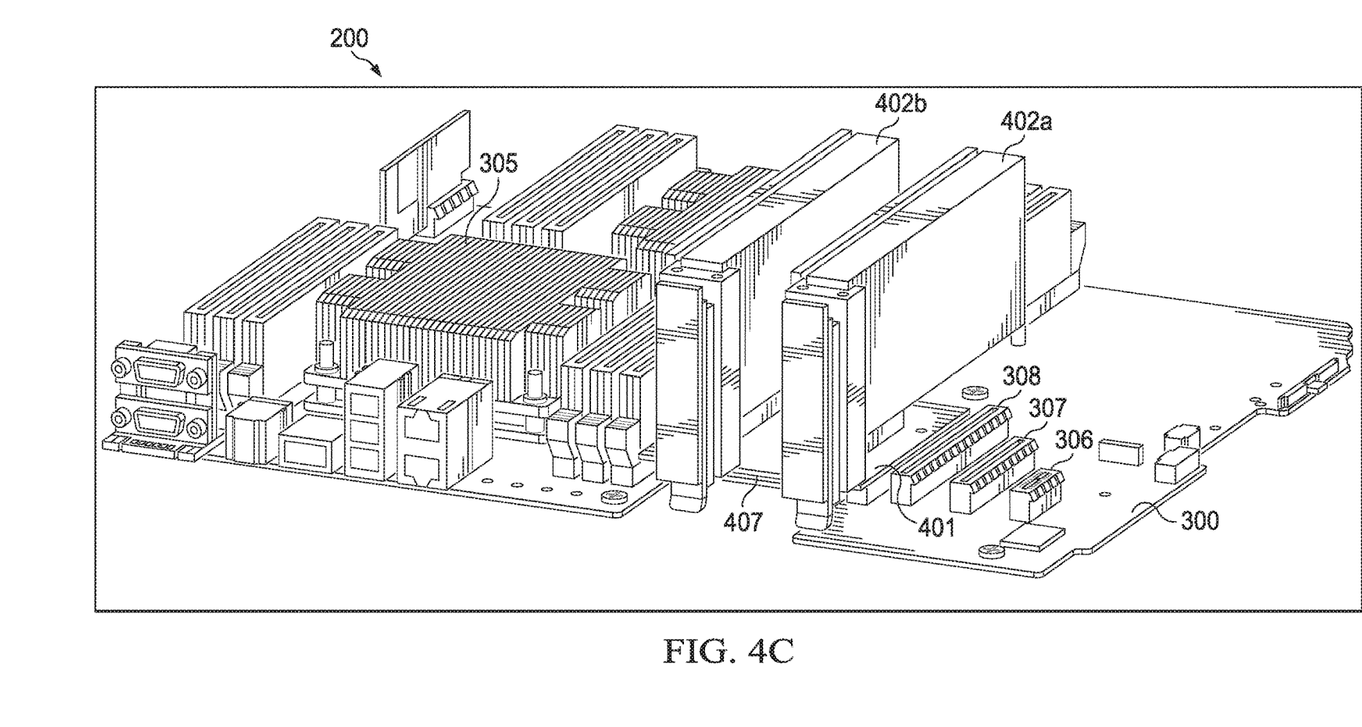

Referring now to FIGS. 4A, 4B, and 4C perspective view of selected elements of an embodiment of a an OCP mezzanine riser 401 with repurposed connectivity for PCIe cards configured for a tower chassis 200 are shown. FIG. 4A shows an embodiment of an OCP mezzanine riser 401 with PCIe connection points 404 in which no PCIe cards have been connected. FIG. 4B provides a side view of OCP mezzanine riser 401 with vertical PCIe cards 402 installed, and FIG. 4C provides a top down view of an OCP mezzanine riser 401 with vertical PCIe cards 402 installed.

As shown in FIGS. 4A, 4B and 4C, the OCP mezzanine riser 401 may include a circuit board 407 on which a series of connectors 403 may be installed. As shown in FIG. 4B, the underside of the OCP mezzanine riser 401 may include at least one OCP connector 403 that mates with the OCP connection points 301-303 on the server motherboard 300 which are designated for an OCP network mezzanine card. FIGS. 4A, 4B, and 4C illustrate one particular embodiment of an OCP mezzanine riser 401 that includes two OCP connectors 403 which connect to two of the three standard OCP connection points on the server motherboard 300, OCP connection point 301, and OCP connection point 302. The OCP connectors 403 used on this OCP mezzanine riser 401 may be different than typical riser cards, which may include card edge style connectors that plug into a PCIe card edge connector.

As shown, the OCP mezzanine riser 401 may be positioned parallel to the mother board 300 and can include at least one PCIe lane 404 on the top side of the riser so that vertical PCI cards 402 may be connected to top side the OCP mezzanine riser 401. As illustrated in FIGS. 4A, 4B and 4C, an OCP mezzanine riser 401 that is parallel to the motherboard and connected to both OCP connections points 301 and 302 allows a tower chassis server 200 to regain two PCIe lanes 404, each having connectivity for x8 PCIe devices, where two vertical PCIe cards 402 may be connected.

While FIGS. 4A, 4B, and 4C illustrate an embodiment where an OCP mezzanine riser 401 is connected to connection point 301 and 302, each providing one x8 PCIe lane, in another embodiment, these lanes can be combined on the parallel OCP mezzanine riser 401 to create a single x16 PCIe slot.

In addition, as shown in FIG. 4B, OCP connection point 303 may supply SERDES connections 306 that can be utilized for Ethernet with a higher bandwidth (e.g., 10 Gb), allowing faster Ethernet capability for tower chassis products. By way of non-limiting example, the OCP mezzanine riser 401 may be implemented with RJ-45 or SFP+ connectors.

Figure 5A:
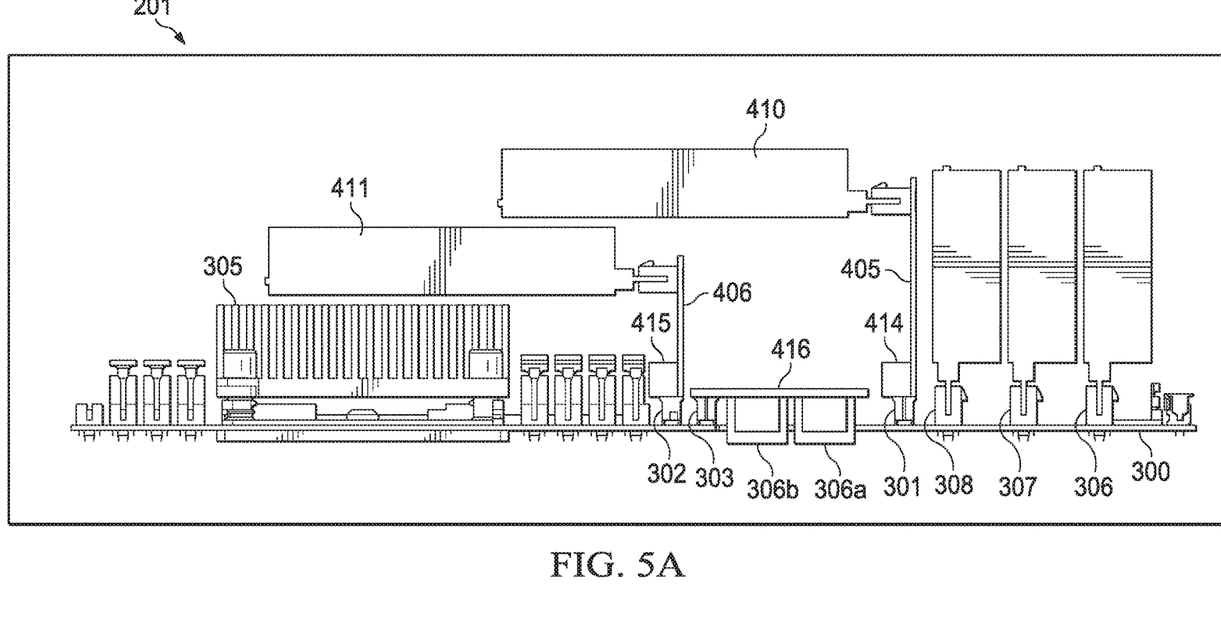
FIGS. 5A and 5B are perspective views of selected elements of an embodiment of a an OCP mezzanine riser with repurposed connectivity for PCIe cards in a low profile rack chassis.
Figure 5B:
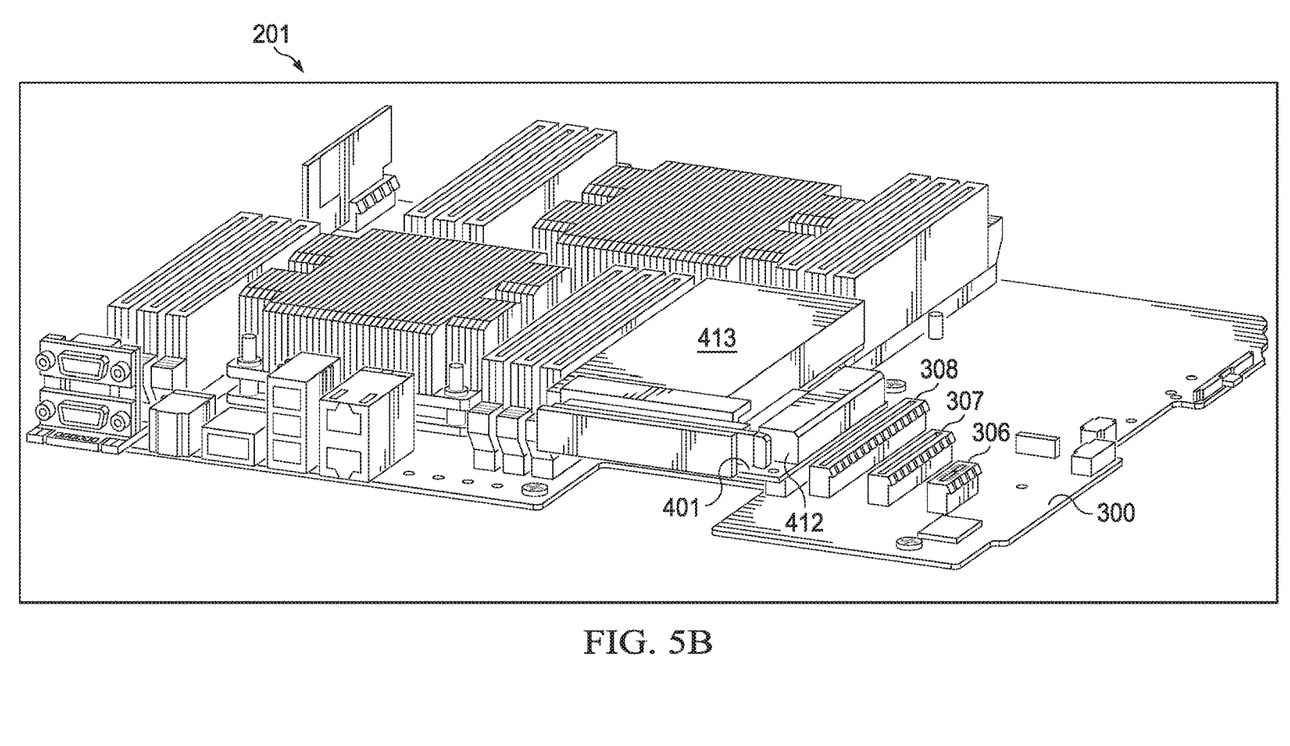

Referring now to FIGS. 5A and 5B, perspective views of selected elements of an embodiment of an OCP mezzanine riser 401 with repurposed connectivity for PCIe cards configured for a low profile rack chassis 201 are shown. FIG. 5A provides a side view of an embodiment of vertical OCP mezzanine risers 405 and 406 with horizontal PCIe cards 410 and 411 connected and installed. FIG. 5B provides a top down view of an embodiment of a horizontal OCP mezzanine riser 407 with a horizontal PCIe card 413 connected and installed to a right angle PCIe card edge connector 412 so that the PCIe card is parallel to the horizontal mezzanine riser 401. As shown in FIG. 5A, in order to repurpose the OCP connectors 301-303 in a low profile (e.g., 1 U) rack chassis, the OCP mezzanine risers 405/406 may be in the form of a vertical riser. The vertical riser has an OCP connector 414/415 that mates with the OCP connector of either OCP connection point 301 or OCP connection point 303 on the server motherboard 300. Once the vertical OCP mezzanine riser 405/406 is connected to either OCP connection 301 or 302 on the motherboard 300, a horizontal PCIe card 410/411 may be connected to the vertical OCP mezzanine riser 405/406. A SERDES network card 416 can also be implemented and connected to OCP connection point 303 to allow for a an upgraded Ethernet path. Alternatively, as shown in FIG. 5B, in order to repurpose the OCP connectors 301-303 in a low profile (e.g., 1 U) rack chassis, the OCP mezzanine riser may be in the form of a horizontal mezzanine riser. A right angle PCIe card edge connector 412 may then be connected to the horizontal OCP mezzanine riser 401, so that a PCI card may be attached and is orientated parallel to the mezzanine riser 401.

While FIGS. 2 through 5B illustrate an embodiment where the connection points on a motherboard are designated for an OCP network mezzanine card, another embodiment of the invention may include an information handling system where the motherboard includes another type of non-PCIe connection points. In that case, a similar mezzanine riser may be configured to connect to the non-PCIe connection points on the motherboard with repurposed connectivity to allow for increased PCIe card count. By way of non-limiting example, the non-PCIe connection points on the server motherboard may be designated for a Dell NDC mezzanine card.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system comprising:
   a motherboard;
   a chassis configured to house one or more components of the information handling system;
   one or more Open Compute Project (OCP) connection points coupled to the motherboard, the OCP connection points designated for an OCP mezzanine card;
   one or more power and sideband connection points coupled to the motherboard, wherein the power and sideband connection points provide a current and sideband signal required by a PCIe card;
   an OCP mezzanine riser coupled to the one or more OCP connection points, wherein the OCP mezzanine riser comprises:
   a circuit board;
   at least one connector mounted on a first side of circuit board coupled with at least one OCP connection point of the server motherboard; and
   one or more PCIe lanes mounted on a second side of the circuit board, wherein a PCIe card is inserted into each of the one or more PCIe lanes of the OCP mezzanine riser.

2. The information handling system of claim 1, wherein the OCP mezzanine riser comprises:
   at least one additional connector mounted on the first side of the mezzanine riser card and configured to mate with at least one power connector on the server motherboard, wherein the additional connector provides both power and sideband signal for a PCIe card.

3. The information handling system of claim 1, wherein the OCP mezzanine riser is horizontally oriented, parallel to the motherboard of a server, wherein a PCIe card may be connected and oriented perpendicular to the motherboard.

4. The information handling system of claim 1, further comprising a right angle PCIe card edge connector, wherein the PCIe card edge connector is connected to a horizontally oriented OCP mezzanine riser so that a PCIe card may be connected and oriented parallel to the motherboard.

5. The information handling system of claim 1, wherein the OCP mezzanine riser is vertically oriented, perpendicular to the motherboard of a server, wherein a PCIe card may be connected and oriented parallel to the motherboard.

6. The information handling system of claim 1, wherein the OCP mezzanine riser is coupled to only one OCP connection point on a server mother board, wherein the only one OCP connection point is an OCP type A connection point and provides connectivity for one x8 PCIe lane.

7. The information handling system of claim 1, wherein the OCP mezzanine riser is coupled to at least two OCP connection points on a server mother board, wherein the at least two OCP connection points comprise an OCP type A connection point and an OCP type B connection point, wherein the OCP connection points act separately to provide connectivity for two x8 PCIe lanes.

8. The information handling system of claim 1, wherein the OCP mezzanine riser is coupled to at least two OCP connection points on a server mother board, wherein the at least two OCP connection points are an OCP type A connection point and an OCP type B connection point, wherein the OCP connection points act contiguously to provide connectivity for one x16 PCIe lane.

9. The information handling system of claim 1, further comprising a SERDES network card, the SERDES network card coupled to an OCP type C connection point of the server motherboard.

10. An Open Compute Project (OCP) mezzanine riser, comprising:
    a circuit board;
    at least two OCP connectors mounted on a first side of the circuit board and configured to mate with at least two OCP connection points on a server mother board, wherein the at least two OCP connection points comprise an OCP type A connection point and an OCP type B connection point, wherein the OCP connection points act either separately or contiguously; and one or more PCIe lanes mounted on a second side of the circuit board, wherein a PCIe card is inserted into each of the one or more PCIe lanes of the OCP mezzanine riser.

11. The OCP mezzanine riser of claim 10, further comprising:
    at least one additional connector mounted on the first side of the mezzanine riser and configured to mate with at least one power connector on the server motherboard, wherein the additional connector provides both power and sideband signal for a PCIe card.

12. The OCP mezzanine riser of claim 10, wherein the mezzanine riser comprises a single OCP connector configured to mate with a single OCP connection point on the server mother board, wherein the single OCP connection point comprises an OCP type A connection point.

13. The OCP mezzanine riser of claim 10, wherein the mezzanine riser comprises at least three OCP connectors configured to mate with at least three OCP connection points on the server mother board, wherein the three OCP connection points comprise an OCP type A connection point, an OCP type B connection point, and an OCP type C SERDES connection point, wherein the SERDES connection point allows for an upgraded Ethernet pathway.

14. The OCP mezzanine riser of claim 10, wherein the connectors on the mezzanine riser are FCI type connectors.

* * * * *